(12) United States Patent
Laupin-Villemus et al.

(10) Patent No.: US 9,744,868 B2
(45) Date of Patent: Aug. 29, 2017

(54) ELECTRIC CIRCUIT FOR CHARGING AT LEAST ONE ELECTRICAL ENERGY STORAGE UNIT BY MEANS OF AN ELECTRICAL NETWORK

(71) Applicant: Valeo Systemes de Controle Moteur, Cergy Saint Christophe (FR)

(72) Inventors: Christophe Laupin-Villemus, Vinay (FR); Thierry Cheng, Les Brevieres (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 171 days.

(21) Appl. No.: 14/380,813

(22) PCT Filed: Feb. 27, 2013

(86) PCT No.: PCT/FR2013/050392
§ 371 (c)(1),
(2) Date: Aug. 25, 2014

(87) PCT Pub. No.: WO2013/128111
PCT Pub. Date: Sep. 6, 2013

(65) Prior Publication Data
US 2015/0042273 A1 Feb. 12, 2015

(30) Foreign Application Priority Data

Feb. 27, 2012 (FR) ...................................... 12 51738

(51) Int. Cl.
*H02J 7/00* (2006.01)
*B60L 11/18* (2006.01)
(Continued)

(52) U.S. Cl.
CPC ................ *B60L 11/182* (2013.01); *B60L 1/04* (2013.01); *B60L 3/003* (2013.01); *B60L 3/0061* (2013.01);
(Continued)

(58) Field of Classification Search
CPC .............. B60L 11/1809; B60L 11/1811; B60L 11/1812; B60L 11/182
(Continued)

(56) References Cited

U.S. PATENT DOCUMENTS 6,548,985 B1 * 4/2003 Hayes ..................... H02J 7/022
320/108
8,963,489 B2 * 2/2015 Abe ........................ H01F 38/14
320/108
(Continued)

FOREIGN PATENT DOCUMENTS

| EP | 2 320 538 A2 | 5/2011 |
| EP | 2 340 961 A2 | 7/2011 |

(Continued)

OTHER PUBLICATIONS

International Search Report for corresponding International Application No. PCT/FR2013/050392, mailed May 17, 2013 (3 pages).
(Continued)

*Primary Examiner* — Stacy Whitmore
(74) *Attorney, Agent, or Firm* — Osha Liang LLP (57) ABSTRACT

An electric circuit (5) for charging at least one electrical energy storage unit (4) by means of an electrical network, the circuit (5) comprising: an inductive cell (6) configured to interact with an inductive cell of the electrical network to exchange energy by electromagnetic induction, a rectifier (13) disposed downstream from the inductive cell (6) and whereof the positive output terminal (17) and the negative output terminal (20) are each connected to a conductor (18, (Continued)

21) of a DC bus (19), a capacitor (22) mounted between the two conductors (18, 21) of the DC bus (19), a power stage (25) whereof the positive input terminal (26) and the negative input terminal (27) are respectively connected to one of the conductors (18, 21) of the DC bus (19), and which is configured to adapt the value of the DC voltage between the positive input terminal (26) thereof and the negative input terminal (27) thereof to the electrical energy storage unit (4), the power stage comprising, at most, two voltage converters, and the electrical energy storage unit (4).

11 Claims, 4 Drawing Sheets (51) Int. Cl.
    H02J 5/00      (2016.01)
    H02J 7/02      (2016.01)
    B60L 1/04      (2006.01)
    B60L 3/00      (2006.01)
    B60L 11/00     (2006.01)

(52) U.S. Cl.
    CPC ......... *B60L 11/005* (2013.01); *B60L 11/1816* (2013.01); *B60L 11/1833* (2013.01); *B60L 11/1877* (2013.01); *H02J 5/005* (2013.01); *H02J 7/0052* (2013.01); *H02J 7/0055* (2013.01); *H02J 7/025* (2013.01); *B60L 11/1809* (2013.01); *B60L 11/1811* (2013.01); *B60L 11/1812* (2013.01); *B60L 2210/14* (2013.01); *B60L 2210/30* (2013.01); *B60L 2210/40* (2013.01); *B60L 2240/34* (2013.01); *B60L 2240/36* (2013.01); *Y02T 10/7005* (2013.01); *Y02T 10/705* (2013.01); *Y02T 10/7022* (2013.01); *Y02T 10/7072* (2013.01); *Y02T 10/7225* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/14* (2013.01)

(58) Field of Classification Search
    USPC ........................................ 320/104, 108–109
    See application file for complete search history.

(56) References Cited

U.S. PATENT DOCUMENTS

| 2005/0198982 | A1* | 9/2005 | Kubo | ............... B60H 1/3222 62/236 |
| 2012/0043172 | A1* | 2/2012 | Ichikawa | ............... B60L 5/005 191/45 R |
| 2012/0306439 | A1* | 12/2012 | Ichikawa | ............. B60L 11/123 320/108 |
| 2013/0049674 | A1* | 2/2013 | Davis | ................... B60L 11/182 320/101 |
| 2013/0320759 | A1* | 12/2013 | Abe | ....................... H01F 38/14 307/10.1 |

FOREIGN PATENT DOCUMENTS

| FR | 2 962 263 A1 | 1/2012 |
| JP | 2007-336710 A | 12/2007 |
| WO | 2010/131348 A1 | 11/2010 |
| WO | 2011/110924 A1 | 9/2011 |
| WO | 2011/151696 A2 | 12/2011 |

OTHER PUBLICATIONS

Ouwerkerk D ED—Electric Vehicle Association of the Americas (EVAA): "Who Says You Can'T Pass High Power Through a Paddle?", International Electric Vehicle Symposium. Anaheim, Dec. 5-7, 1994; [International Electric Vehicle Symposium], San Francisco, EVAA, US, vol. Symp. 12, Dec. 5, 1994 pp. 612-618, XP000488504 (7 pages).

* cited by examiner

ELECTRIC CIRCUIT FOR CHARGING AT LEAST ONE ELECTRICAL ENERGY STORAGE UNIT BY MEANS OF AN ELECTRICAL NETWORK

The present invention relates to an electric circuit for charging at least one electrical energy storage unit by means of an electrical network.

The invention applies particularly, but not exclusively, to the charging of an electrical energy storage unit by electromagnetic induction. This electrical energy storage unit can power an electric motor driving a vehicle.

Figure 1:
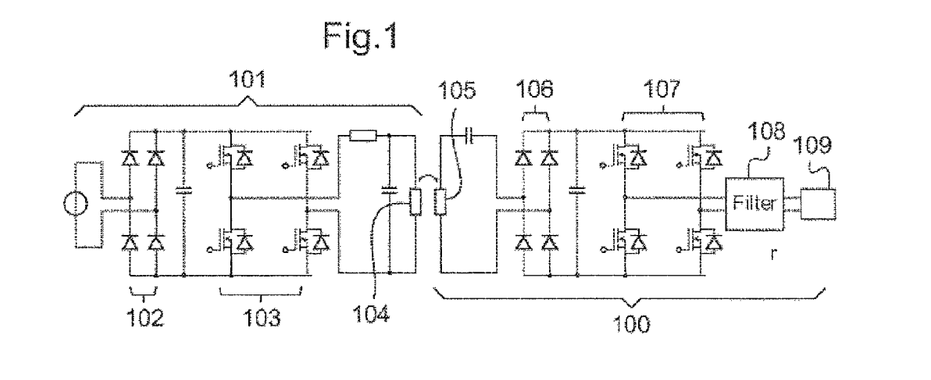
FIG. 1, already described, shows the electrical structure of the charging station and the electric circuit for charging a vehicle of the prior art, FIG. 2 schematically shows a charging station and a vehicle comprising an electric circuit for charging according to an exemplary implementation of the invention.

It is known practice to charge a vehicle battery by electromagnetic induction. FIG. 1 shows a known circuit 100 for charging by electromagnetic induction. This circuit 100 is configured for receiving energy by electromagnetic induction from an electrical network 101 delivering an AC voltage, the frequency of which is 50 Hz or 60 Hz for example. To perform this charging by electromagnetic induction, the voltage of the network 101 is rectified by a rectifier 102 then converted into an AC voltage of a frequency approximately equal to 140 kHz by an inverter 103. The output voltage of the inverter 103 then powers an inductive cell 104, in this case an antenna, and the powering of this cell 104 by the electrical network 101 generates an electromagnetic field.

The circuit 100 comprises an inductive cell 105, for example a coil, and when this inductive cell 105 is immersed in the magnetic field generated by the cell 104, an AC voltage of a frequency substantially equal to 140 kHz is induced across the terminals of the cell 105. This AC voltage is rectified by a rectifier 106 before being applied to an inverter 107 converting the output voltage of the rectifier 106 into an AC voltage of a frequency substantially equal to that of the electrical network 101. This voltage is then received, optionally after passing through a filter 108, at the input of a conventional charging circuit 109. This charging circuit 109 is normally configured to be connected to the electrical network 101 via a connection point. The rectifier 106 and the inverter 107 thus form an additional stage arranged upstream of the conventional wired charging circuit 109.

The circuit 100 of the prior art thus aims to recreate inside the vehicle an electrical signal having the same features as the electrical signal that would be transmitted in a wired manner by the electrical network 101.

With such a circuit 100, two additional voltage converters, namely the rectifier 106 and the inverter 107 downstream of the inductive cell 105, must be on board the vehicle, in addition to the voltage converters of the conventional wired charging circuit 109. This high number of converters on board the vehicle has negative consequences in terms of cost and bulk. Furthermore, each of these voltage converters can cause a certain amount of overheating and the high number of voltage converters in the vehicle can thus pose problems in terms of overheating and therefore efficiency.

There is a need to remedy all or some of the drawbacks above.

The aim of the invention is to meet this need and this is achieved, according to one of its aspects, using an electric circuit for charging at least one electrical energy storage unit by means of an electrical network, the circuit comprising:

an inductive cell configured for interacting with an inductive cell of the electrical network to exchange energy by electromagnetic induction, a rectifier arranged downstream of the inductive cell and whose positive output terminal and negative output terminal are each linked to one conductor of a DC bus, a capacitor connected between the two conductors of the DC bus, a power stage whose positive input terminal and negative input terminal are respectively linked to one of the conductors of the DC bus, and which is configured for matching the value of the DC voltage between its positive input terminal and its negative input terminal to the electrical energy storage unit, the power stage comprising at most two voltage converters, and the electrical energy storage unit.

According to the circuit above, the conversion of the AC voltage induced across the terminals of the inductive cell into a DC voltage powering the electrical energy storage unit requires at most three voltage converters, namely the rectifier and the at most two voltage converters of the power stage.

The aspect of the invention above consists in modifying the conventional wired charging circuit and in using this modified circuit between the electrical network and the electrical energy storage unit, unlike the example described with reference to FIG. 1 wherein an additional stage is required upstream of the conventional charging circuit.

It is thus possible to reduce the number of converters in relation to the circuit according to FIG. 1 wherein at least four voltage converters are required between the inductive cell and the electrical energy storage unit, which procures a benefit in terms of cost and/or bulk and/or overheating.

In the following text, the term "electrical network" denotes an industrial electrical network managed by an operator and deployed over a community, a region, one or more states, or a local and/or independent network, particularly private.

The electrical energy storage unit is for example a battery or several batteries connected in series or in parallel, or several parallel arms of batteries in series, and the nominal voltage across the terminals of this electrical energy storage unit can be between 280 V and 350 V, being notably in the order of 330 V. In a variant, super-capacitors can be used, for example. Elements other than batteries or super-capacitors can be used.

The inductive cell is for example configured for an AC voltage to be generated between its terminals when it is subjected to a magnetic field of a frequency between 100 kHz and 180 kHz, notably in the order of 140 kHz. This cell can be a resonator cell. Such magnetic fields allow a transfer of energy by electromagnetic induction observing the requirements in terms of electromagnetic compatibility and harmonic pollution.

The rectifier can comprise electronic switches configured for rectifying an AC voltage, the frequency of which is between 100 kHz and 200 kHz, being 140 kHz for example. These electronic switches can be controllable, being particularly transistors, field-effect transistors for example, or they can be non-controllable, being diodes for example. These switches can operate by natural switching at a frequency equal to that of the voltage to be rectified. When these electronic switches are controllable, they can be controlled to switch at a frequency equal to twice the value of the frequency of the voltage to be rectified.

The voltage across the terminals of the capacitor can be equal to the voltage between the input terminals of the power stage and to the voltage between the output terminals of the rectifier, i.e. the capacitor can be directly linked to the output of the rectifier and to the input of the power stage.

According to an exemplary implementation of the invention, the power stage is formed by a DC/DC voltage converter. In this example, only two voltage converters are interposed between the inductive cell and the electrical energy storage unit.

According to another exemplary implementation of the invention, the power stage is formed by the series combination of an additional inverter and an additional rectifier. In this example, three voltage converters are interposed between the inductive cell and the electrical energy storage unit.

In the two exemplary implementations of the invention that have just been mentioned, the voltage converter(s) of the power stage can comprise controllable electronic switches, for example transistors and particularly field-effect transistors.

The electric circuit can be exclusively dedicated to charging the electrical energy storage unit by electromagnetic induction.

Due to the high values for the switching frequencies of the electronic switches, heat dissipating means can be provided. Such means are for example means allowing cooling by natural or forced convection. An air- or water-cooled heat sink such as a heat exchanger can be used.

The invention also covers the case where the charging circuit is configured for allowing the charging of the electrical energy storage unit by electromagnetic induction or by means of a wired connection point, i.e. according to different charging modes.

In this case, the electric circuit can comprise a connector connected in parallel with the inductive cell, upstream of the rectifier, said connector being configured for being connected to a connector of complementary type in the electrical network.

The electronic switches of the rectifier can then be configured for rectifying an AC voltage, the frequency of which is in the order of 50 Hz or 60 Hz. The electronic switches can then operate by natural switching at a frequency equal to that of the voltage to be rectified. When the electronic switches are controllable, they can be controlled to switch at a frequency equal to at least twice the value of the frequency of the voltage to be rectified.

These switches of the rectifier, which are in this case also responsible for rectifying the voltage induced across the terminals of the inductive cell, can then exhibit an operating range for switching frequency between 50 Hz and 360 kHz, this range of switching frequency values allowing the electronic switches to provide just as satisfactory rectification for an AC signal with a frequency in the order of 140 kHz as for an AC signal with a frequency in the order of 50 Hz or 60 Hz. According to this example, the general structure of the conventional wired charging circuit is preserved but certain components of this circuit are modified, for example the electronic switches of the rectifier upstream of the capacitor.

In a variant, the possibility for the electric circuit to also provide wired charging from the electrical network is obtained using a connector configured to be connected to said network and to a low-frequency rectifier, the connector being connected to the input of the low-frequency rectifier and the output of this low-frequency rectifier being connected in parallel with the output of the rectifier downstream of the inductive cell, the latter rectifier being then called a high-frequency rectifier.

The low-frequency rectifier can comprise electronic switches configured for rectifying a voltage the frequency of which is in the order of 50 Hz or 60 Hz.

In this variant, two rectifiers are connected in parallel upstream of the capacitor: the high-frequency rectifier whose electronic switches are chosen to rectify a voltage with a frequency notably between 100 kHz and 180 kHz and the low-frequency rectifier whose electronic switches are chosen to rectify a voltage with a frequency for example in the order of 50 Hz or 60 Hz.

However, the terms "high frequency" and "low frequency" must not be each limited to the values of frequency above.

The controlling of the switches of the low-frequency rectifier can be carried out to provide a so-called "Power Factor Corrector" (PFC) function.

In this variant, each rectifier is matched to the voltage that it must rectify and each rectifier can work optimally. The components of the conventional charging circuit are then not modified but a part dedicated to charging by electromagnetic induction is then added to the conventional wired charging circuit.

The electric circuit can comprise a charging mode selection unit configured for detecting which of the connector and the inductive cell receives energy from the electrical network and for linking whichever of the connector and the inductive cell is powered to the rest of the electric circuit to charge the electrical energy storage unit from the electrical network. This charging mode selection unit can be remote from the rest of the electric circuit for charging.

The electric circuit can comprise a control unit for the electronic switches of the circuit. This control unit can make it possible to ensure that the electrical energy storage unit is receiving a voltage of adequate value. The control unit can for example control the electronic switches of one of the rectifiers and/or of the power stage to carry out the charging. Optionally, this control of the electronic switches can be carried out as a function of the state of charge of the battery.

The electrical network can be a multi-phase, notably three-phase, network or be a single-phase network.

Another subject of the invention, according to another of its aspects, is an electric circuit for charging at least one electrical energy storage unit by means of an electrical network, the circuit comprising:

an inductive cell configured for interacting with an inductive cell of the electrical network to exchange energy by electromagnetic induction and a high-frequency rectifier arranged downstream of the inductive cell and whose positive output terminal and negative output terminal are each linked to one conductor of a DC bus, a connector configured for being connected to an additional connector of the electrical network and a low-frequency rectifier arranged downstream of said connector, whose positive output terminal is linked to the positive output terminal of the high-frequency rectifier and whose negative output terminal is linked to the negative output terminal of the high-frequency rectifier, a capacitor connected between the two conductors of the DC bus, a power stage whose positive input terminal and negative input terminal are respectively linked to one of the conductors of the DC bus, and which is configured for matching the value of the DC voltage between its positive input terminal and its negative input terminal to the electrical energy storage unit, and the electrical energy storage unit.

Another subject of the invention, according to another of its aspects, is a method for charging an electrical energy storage unit by means of an electrical network using an electric circuit comprising a charging mode selection unit as disclosed above, in which method:

it is detected that one of the inductive cell and the connector is powered by the network, and whichever of the inductive cell and the connector is powered by the network is linked to the rest of the electric circuit whose electronic switches are controlled so as to charge the electrical energy storage unit from the electrical network.

Another subject of the invention, according to another of its aspects, is a method for identifying a vehicle by means of an electrical charging station, the electrical charging station comprising:

an inductive cell, and a system for exchanging data, the vehicle comprising:

an electrical energy storage unit, an inductive cell configured for interacting with the inductive cell of the charging station to exchange energy by electromagnetic induction, and a system for exchanging data, in which method, prior to the exchange of energy by electromagnetic induction between said inductive cells, an exchange of data is conducted between the station and the vehicle to identify the vehicle.

At the end of this exchange of data, the charging of the electrical energy storage unit of the vehicle can be authorized.

An identifier of the vehicle user or of the vehicle can be transmitted to the charging station upon the exchange of data and, as a function of this identifier, the sending by electromagnetic induction, by the station, of energy to charge the electrical energy storage unit can be authorized.

The information exchanged can moreover concern the level of charge of the electrical energy storage unit and/or the nominal voltage of this electrical energy storage unit, so that this exchange can make it possible to determine the energy throughput that the charging station must send to the electric charging circuit.

The exchange of data between the vehicle and the charging station can be done via radio frequencies, RFID technology being notably implemented in the exchange system of the charging station and in that of the vehicle.

The exchanged data can thus make it possible to automate the exchange of energy between the charging station and the vehicle and/or the billing of this charging.

In addition to the exchange of data between the vehicle and the charging station, an exchange of data can take place between the charging station and a computer terminal of the vehicle or of the user. This exchange of data can take place by means of radio frequencies or using a communication network, particularly the telephone or Internet. This data can pertain to the charging of the vehicle in progress and indicate at least one of the following items of information: the level of charge of the electrical energy storage unit, the remaining charging time, the autonomy in kms of the vehicle as a function of the level of charge or else the cost of the charging already performed.

During the charging of the electrical energy storage unit by electromagnetic induction, other information can be exchanged between the computer terminal and the charging station, for example data relating to the billing for the energy used to charge the electrical energy storage unit.

Also during the charging by electromagnetic induction, the computer terminal can communicate with the vehicle to activate pre-conditioning functions of components of this vehicle, for example to activate systems for de-icing windows, heating the seats, heating the engine or air-conditioning the passenger compartment.

Another subject of the invention, according to another of its aspects, is a method for assisting the positioning of a vehicle in relation to an electrical energy charging station, the vehicle comprising an electric circuit for charging an electrical energy storage unit by electromagnetic induction, said circuit comprising an inductive cell configured for interacting with an inductive cell of said station to exchange energy by electromagnetic induction, in which method the user of the vehicle is supplied with an item of information representing the position of the inductive cell of the circuit with respect to the inductive cell of the charging station.

The item of information representing the position of the inductive cell of the circuit with respect to the inductive cell of the charging station can be said position of the inductive cell of the circuit with respect to the inductive cell of the charging station or an item of information that reflects said position.

The item of information reflecting said position can be a level of efficiency of the transfer of energy from the electrical network to the vehicle. It can for example be the ratio of the value of the voltage across the terminals of the inductive cell of the circuit to the value of the voltage across the terminals of the inductive cell of the charging station. This ratio, which results from the position of the inductive cells in relation to each other, allows the user of the vehicle to move the latter in such a way that the ratio has a maximum value corresponding to the optimal position of the vehicle in relation to the station.

In a variant, the item of information reflecting said position can be a map in two dimensions representing the inductive cell of the circuit, that of the charging station and the area around the inductive cell of the station wherein the inductive cell of the circuit can recover electrical energy. Optionally, several different areas can be represented on this map, ranges of values of the above ratio being associated with each of these areas, for example.

This item of information representing the position of the inductive cell of the circuit with respect to the inductive cell of the charging station can also be used by a system allowing the vehicle to park automatically when the vehicle is parked near the charging station in order to charge the electrical energy storage unit by electromagnetic induction.

In a variant, the vehicle can be equipped with a system of GPS type and the coordinates of the recharging station can be entered or previously stored in this system. The item of information representing the position of the inductive cell of the circuit in relation to that of the station can then appear in the form of navigation data supplied by the system of GPS type.

According to the above method, the item of information representing the position of the inductive cell of the electric circuit in relation to the inductive cell of the charging station can be a visual or audible data item.

The invention will be better understood upon reading the following description of non-limiting exemplary implementations of the latter and upon examining the appended drawings in which.

Figure 2:
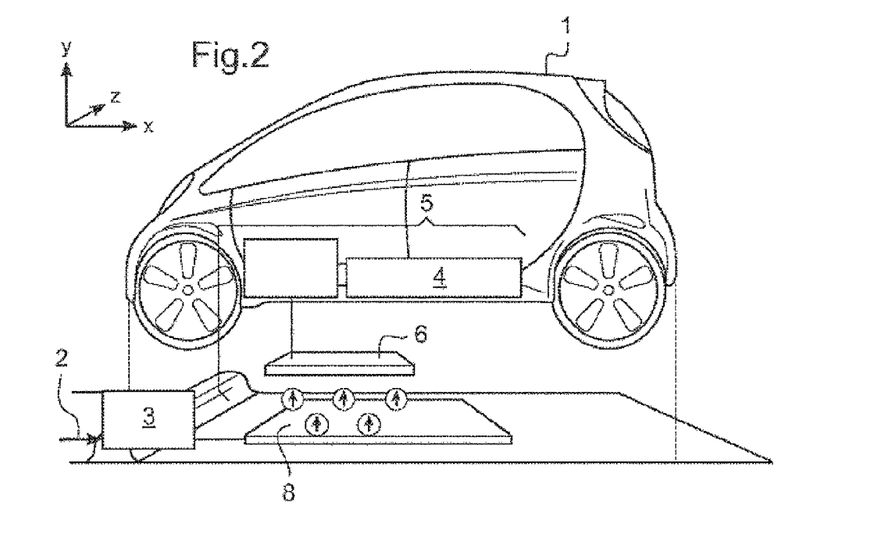

FIG. 2 shows a vehicle 1 interacting with a charging station 3 of an electrical network 2 for charging an electrical energy storage unit 4 by means of an electric charging circuit 5. The electrical network 2 distributes a single-phase or multi-phase, for example three-phase, AC voltage with a frequency of 50 Hz or 60 Hz in particular.

The electrical energy storage unit 4 is for example formed by one or more batteries connected in parallel or in series, or else by several parallel arms with the batteries connected in series. The electrical energy storage unit 4 has for example a nominal voltage between 280 V and 350 V, notably in the order of 330 V, and it is used to electrically power an electric motor for driving a hybrid or electric vehicle.

Figure 3:
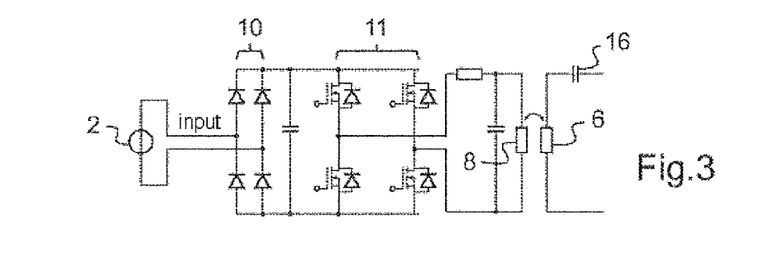
FIG. 3 shows, in a manner similar to FIG. 1, an example of the electrical structure of the charging station and of a part of the electric circuit for charging according to an exemplary implementation of the invention, FIG. 4 schematically shows the electric circuit for charging in FIG. 3, FIG. 5 corresponds to FIG. 3 in which the whole of an example of an electric circuit for charging according to the invention is shown.

The charging circuit 5 comprises an inductive cell 6, configured for generating an AC voltage when it is immersed in a magnetic field. In the example under consideration, the inductive cell 6 is a coil. This inductive cell 6 interacts with an inductive cell 8 of the recharging station 3. As shown in FIG. 3, the electrical structure of the charging station 3 can be similar to that shown in FIG. 1, i.e. it can comprise a rectifier 10 converting the voltage of the network 2 into a DC voltage and an inverter 11 converting the DC voltage into an AC voltage having a frequency for example between 100 kHz and 180 kHz, being for example in the order of 140 kHz. Such frequency values are matched to the transfer of energy by electromagnetic induction. The electromagnetic waves for this transfer of energy are generated by the inductive cell 8 which is for example an antenna.

As can be seen by comparing FIGS. 1 and 3, one of the aspects of the invention consists in adapting the conventional wired charging circuit 109 to use it directly at the output of the inductive cell 6, without needing the additional stage formed by the rectifier 106 and the inverter 107.

Figure 4:
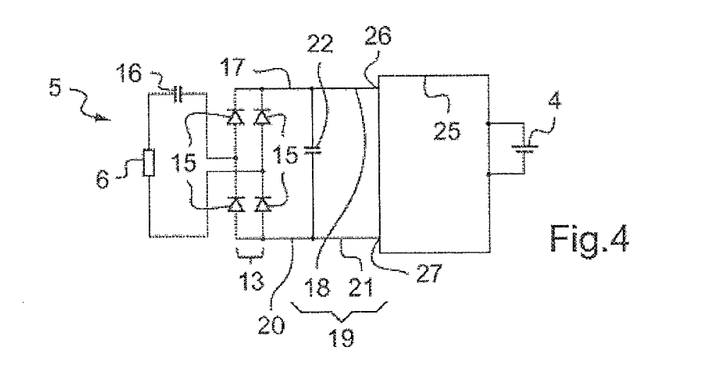

FIG. 4 schematically shows an example of a charging circuit 5 for charging the electrical energy storage unit 4 from the electrical network 2.

As shown, the voltage induced across the terminals of the inductive cell 6 is applied to a rectifier 13 including electronic switches 15. In the example described, these switches 15 are diodes but, in non-represented variants, controllable switches can be used for the rectifier 13. These electronic switches 15 are configured for rectifying the voltage applied to the rectifier 13, the frequency of which can be between 100 kHz and 180 kHz. Optionally, a capacitor 16 can be interposed between the inductive cell 6 and the rectifier 13. The capacitor 16 notably makes it possible to perform impedance matching between the inductive cell 6 and the input of the rectifier 13, in order to ensure operation at resonance.

The positive terminal 17 of the rectifier 13 is linked to a first conductor 18 of a DC bus 19 whereas the negative terminal 20 of the rectifier 13 is linked to a second conductor 21 of the DC bus 19.

A capacitor 22 is connected between the first conductor 18 and the second conductor 21 and this capacitor 22 can have a capacitance between 1500 µF and 2500 µF. The capacitor 22 is, in the example shown, connected in parallel with the output of the rectifier 13 and the input of a power stage 25. This power stage 25 comprises at most two voltage converters and it is configured for matching the value of the DC voltage across the terminals of the capacitor 22 to the electrical energy storage unit 4.

The power stage 25 can exhibit a positive input terminal 26 linked to the conductor 18 of the DC bus 19 and a negative input terminal 27 linked to the conductor 21 of the DC bus 19.

The power stage 25 can be formed by a DC/DC voltage converter. It can for example be a series chopper or a parallel chopper (also called buck converter and boost converter respectively).

Figure 5:
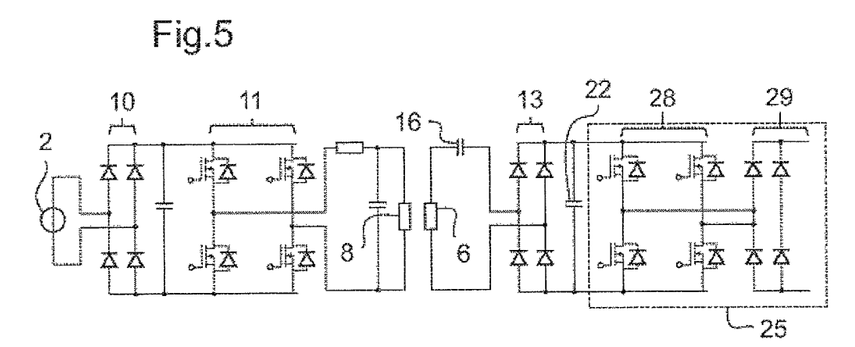

In a variant, and as shown in FIG. 5, the power stage 25 can comprise an inverter 28, the output of which forms the input of a rectifier 29. In this case, the electric circuit 3 for charging the electrical energy storage unit 4 comprises three voltage converters whereas it only comprises two in the case where the power stage 25 is formed by a DC/DC voltage converter.

In the examples in FIGS. 3 to 5, the charging circuit 5 only allows the charging of the electrical energy storage unit 4 by electromagnetic induction. The invention is, however, not limited to these examples but can make it possible to switch between two charging modes, namely charging by electromagnetic induction and wired charging, as will be seen.

In all the examples under consideration, the piloting of the electronic switches of the voltage converters can be provided by a piloting unit, not shown, the latter comprising for example one or more microcontrollers.

Figure 6:
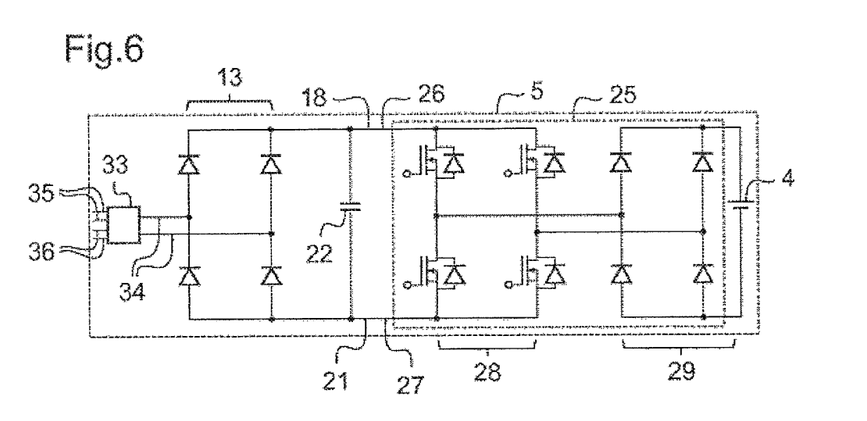
FIGS. 6 and 7 show two variants of the electric circuit in FIG. 5 allowing either charging by electromagnetic induction wired charging.
Figure 8:
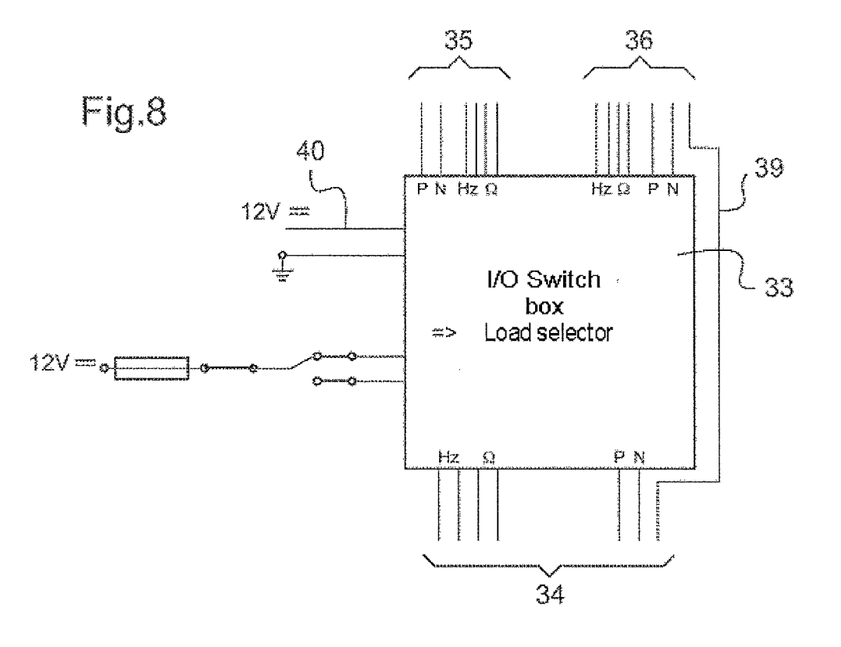
FIG. 8 shows an example of a charging mode selection unit that can be incorporated into the electric circuit shown in FIG. 6.

In the example in FIG. 6, a charging mode selection unit 33 is arranged upstream of the rectifier 13, so that the input of the rectifier 13 corresponds to the output 34 of the unit 33. As can be seen in FIG. 8, the charging mode selection unit 33 comprises inputs 35 linked to the inductive cell 6 and inputs 36 linked to a connector, for example a connection point, configured for being connected to an additional connector of the electrical network 2, for example a plug, to provide for wired charging of the electrical energy storage unit 4. A grounding conductor 39 can bypass the charging mode selection unit 33, as shown in FIG. 8.

Figure 9:
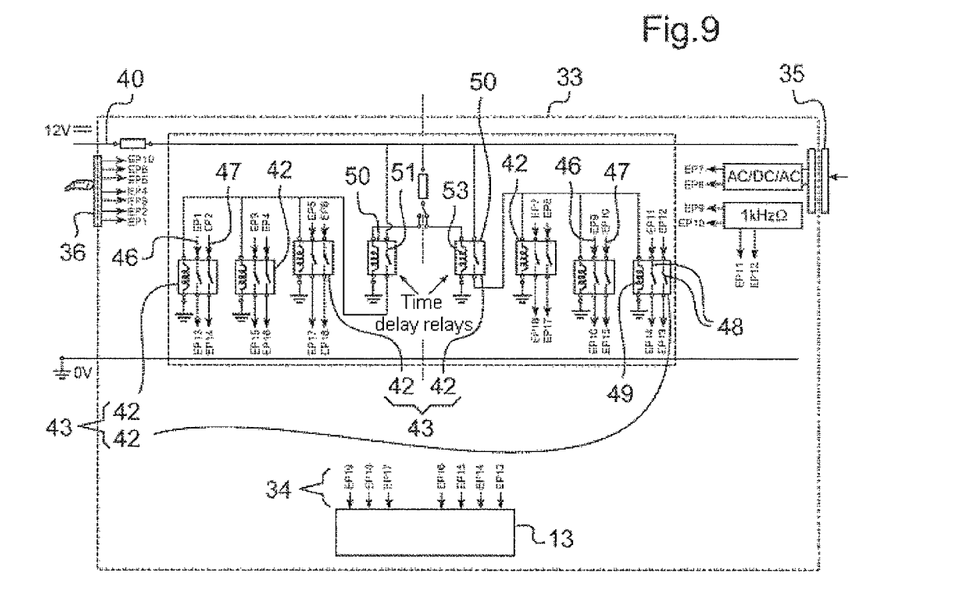
FIG. 9 shows an example of an architecture of the piloting unit in FIG. 8.

The charging mode selection unit 33 can be powered by the on-board network 40 of the vehicle 1, the latter delivering for example a voltage in the order of 12 V which serves as power supply and control supply for the unit 33. A detailed exemplary implementation of the unit 33 is illustrated in FIG. 9.

As shown, the charging mode selection unit 33 can comprise a plurality of cells 42. The cells 42 can be paired, two cells of one and the same pair 43 being linked to one and the same output of the charging mode selection unit 33, whereas one of the cells of the pair 43 has its inputs linked to the inductive cell 6 and the other of the cells of said pair has its inputs linked to the connector.

Each cell 42 can comprise two electrical wires 46 and 47 each extending between two ends respectively forming an input and an output of the cell 42. A switch 48 can be arranged between the ends of each wire. Each cell 42 moreover includes a coil 49 which, when it is electrically powered, modifies the position of the switches 48 of the cell. Each cell 42 can thus form an electromechanical relay and convey an electric current of at least 32 A.

The charging mode selection unit 33 further comprises two main cells 50 connected in parallel. One of these main cells 50 controls the supply of electrical power to all the coils 49 of the cells whose wires 46 and 47 are linked to the inductive cell 6 whereas the other main cell 50 controls the supply of electrical power to all the coils 49 of the cells 42 whose wires 46 and 47 are linked to the connector.

Each main cell 50 also comprises, in the example shown, a switch 51 interposed between the on-board network 40 and the coils 49 of each cell 42. Each main cell 50 also comprises in this example a coil 53 that can be electrically powered by the on-board network 40 according to choice. When the coil 53 of a main cell 50 is electrically powered, it moves the switch 51 from said cell, which, according to its position, enables or does not enable the supply of power to all the coils 49 downstream of said switch.

Whether or not the charging mode selection unit 33 is produced as illustrated in FIG. 9, it can exhibit the following properties:
- not switching the grounding conductor 39 visible in FIG. 8 and linked to the connector,
- introducing a wait time for passing from one charging mode to the other, for example in the order of a few seconds,
- reducing the self-discharging phenomenon of the electrical energy storage unit 4 when the vehicle is parked and no charging is in progress,
- protecting the electrical network 2.

In the example shown in FIG. 6, the rectifier 13 is configured for rectifying either an AC voltage with a frequency between 100 kHz and 180 kHz or an AC voltage with a frequency for example of 50 Hz or 60 Hz. To be able to operate satisfactorily whatever the value of the frequency of the AC voltage to be rectified, the switches of the rectifier 13 can switch at any frequency within a range of values extending from 50 Hz to 180 kHz in the case of operation by natural switching when the electronic switches 15 are diodes.

When the electronic switches 15 are controllable, they can be controlled in such a way as to switch at any frequency within a range of values extending for example from 100 Hz to 360 kHz, according to whether they rectify a voltage at 50 or 60 Hz or a voltage at 140 kHz for example. An example of an electronic switch that can be used to do this is the series or parallel combination of IRF 150 N-channel MOSFET transistors marketed by the MAGNATEC® company.

According to the charging mode of the electrical energy storage unit, the piloting unit—not shown—can control the electronic switches of the electric circuit 5, for example those of the power stage 25, in such a way as to supply a DC voltage of a value matched to the electrical energy storage unit 4.

Figure 7:
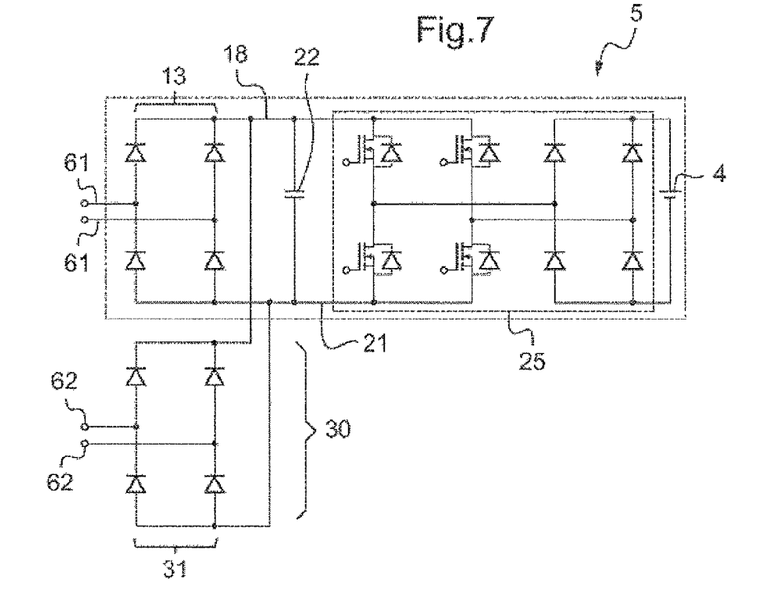

In the variant shown in FIG. 7, the electric circuit 5 comprises an additional stage 30 dedicated to wired charging, this stage 30 comprising a connector, not shown, for example a connection point, similar to that described with reference to FIG. 6 and a rectifier 31. This rectifier 31 is configured for rectifying the AC voltage delivered via the connector by the electrical network 2, i.e. a signal the frequency of which is for example in the order of 50 Hz or 60 Hz. In this example, the rectifier 13 can be called a "high-frequency rectifier" whereas the rectifier 31 can be called a "low-frequency rectifier", without this restrictively limiting the values of the frequency range of the signal rectified by each rectifier.

In this variant, each rectifier is thus dedicated to one charging mode. A charging mode selection unit can be provided to activate the rectifier 13 or 31 at the input of which a voltage is applied due to the powering by the electrical network 2. The input 61 or 62, of the rectifier 13 or 31 respectively, can be an output of this charging mode selection unit.

The electric circuit 5 according to all the examples above can exhibit the same energy performance as the circuit 109 for conventional wired charging in FIG. 1 although it has a different operating station. This circuit can guarantee a total harmonic distortion on the electrical network 2. This circuit 5 can make it possible to deliver to the electrical energy storage unit 4 a power in the order of 3.5 kW over approximately 6 hours of charging.

The invention is not limited to the examples that have just been described.

The expression "including a" must be understood to be a synonym of the expression "including at least one", except when specified to the contrary.

The invention claimed is:

1. An electric circuit for charging at least one electrical energy storage unit by means of an electrical network, the circuit comprising:
   an inductive cell configured for interacting with an inductive cell of the electrical network to exchange energy by electromagnetic induction;
   a first rectifier arranged downstream of the inductive cell and whose positive output terminal and negative output terminal are each linked to one conductor of a DC bus;
   a capacitor connected between the two conductors of the DC bus;
   a power stage whose positive input terminal and negative input terminal are respectively linked to one of the two conductors of the DC bus, and which is configured for matching a value of the DC voltage between its positive input terminal and its negative input terminal to the electrical energy storage unit, the power stage comprising at most two voltage converters;
   the electrical energy storage unit; and
   a connector connected in parallel with the inductive cell upstream of the first rectifier, said connector being configured for connection to an additional connector of the electrical network.

2. The circuit as claimed in claim 1, the first rectifier comprising electronic switches configured for rectifying an AC voltage, the frequency of which is between 100 kHz and 200 kHz.

3. The circuit as claimed in claim 1, a voltage across the terminals of the capacitor being equal to a voltage between the input terminals of the power stage and to a voltage between the output terminals of the first rectifier.

4. The circuit as claimed in claim 1, the electrical energy storage unit having a nominal voltage between 280 V and 350 V.

5. The circuit as claimed in claim 1, the power stage being a DC/DC voltage converter.

6. The circuit as claimed in claim 1, the electronic switches of the first rectifier being configured for rectifying an AC voltage, the frequency of which is in the order of 50 Hz or 60 Hz.

7. The circuit as claimed in claim 1, comprising a connector and a second rectifier, the connector being connected to the input of the second rectifier, the output of which is connected in parallel with the output of the rectifier that is downstream of the inductive cell.

8. The circuit as claimed in claim 7, the second rectifier comprising electronic switches configured for rectifying a voltage the frequency of which is in the order of 50 Hz or 60 Hz.

9. The circuit as claimed in claim 1, further comprising a charging mode selection unit that detects which of the connector and the inductive cell receives energy from the electrical network and that links whichever of said connector or said inductive cell is powered to the rest of the electric circuit to charge the electrical energy storage unit from the electrical network.

10. A method for charging an electrical energy storage unit by means of an electrical network using an electric circuit comprising a charging mode selection unit as claimed in claim 9, the method comprising:
  detecting that one of the inductive cell and the connector is powered by the electrical network, and
  whichever of the inductive cell and the connector is powered by the network is linked to the rest of the electric circuit whose electronic switches are controlled so as to charge the electrical energy storage unit from the electrical network.

11. An electric circuit for charging at least one electrical energy storage unit by an electrical network, the circuit comprising:
  an inductive cell configured for interacting with an inductive cell of the electrical network to exchange energy by electromagnetic induction;
  a first rectifier arranged downstream of the inductive cell and whose positive output terminal and negative output terminal are each linked to one conductor of a DC bus;
  a capacitor connected between the two conductors of the DC bus;
  a power stage whose positive input terminal and negative input terminal are respectively linked to one of the two conductors of the DC bus, and which is configured for matching a value of the DC voltage between the positive input terminal and the negative input terminal to the electrical energy storage unit, the power stage comprising at most two voltage converters; and
  the electrical energy storage unit,
  wherein the power stage is formed by the series combination of an additional inverter and a second rectifier.

* * * * *